United States Patent [19]
Cooper

[11] 3,826,944
[45] July 30, 1974

[54] CATHODE RAY TUBE WITH INORGANIC PHOSPHOR AND FIBER OPTIC FACE PLATE

[75] Inventor: Kenneth Cooper, Horseheads, N.Y.

[73] Assignee: Westinghouse Electric Corporation, Pittsburgh, Pa.

[22] Filed: June 4, 1970

[21] Appl. No.: 43,531

[52] U.S. Cl. ............ 313/92 LF, 350/160 P, 313/91
[51] Int. Cl. ........................ H01j 29/20, H01j 29/12
[58] Field of Search .................... 313/92 LF, 92 PF; 178/7.85

[56] References Cited
UNITED STATES PATENTS

| 3,141,106 | 7/1964 | Kapany | 313/92 LF |
| 3,225,138 | 12/1965 | Montani | 178/7.86 |
| 3,331,920 | 7/1967 | Larson | 178/7.88 |
| 3,474,445 | 10/1969 | Redman | 313/92 LF X |
| 3,519,742 | 7/1970 | Bjelland | 178/7.86 X |

*Primary Examiner*—Robert Segal
*Attorney, Agent, or Firm*—C. F. Renz

[57] ABSTRACT

A high contrast cathode ray tube which incorporates a phosphor material responsive to electronic bombardment and generates ultraviolet radiations in response thereto and in which the ultraviolet phosphor is provided on the inner surface of a fiber optic window. Positioned on the outer surface of the fiber optic faceplate is an ultraviolet transmitting, visible absorbing filter with an organic phosphor emitting visible light in response to ultraviolet excitation and a visible transmitting, ultraviolet absorbing filter provided on the outer surface of the organic phosphor.

3 Claims, 1 Drawing Figure

PATENTED JUL 30 1974        3,826,944
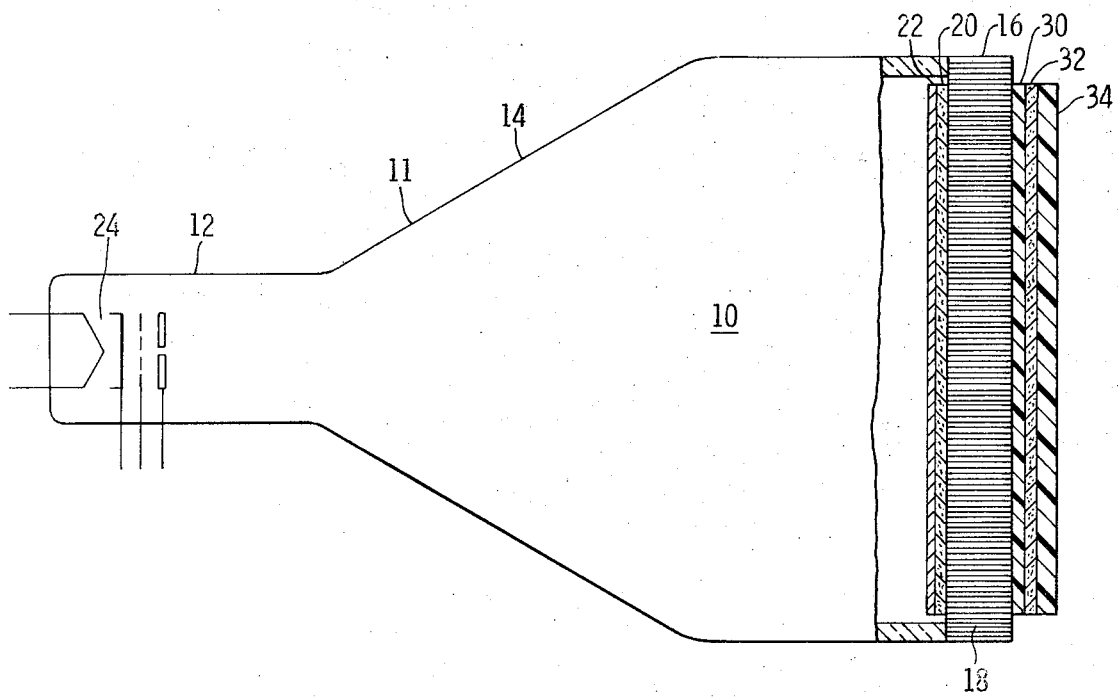
WITNESSES
INVENTOR
KENNETH COOPER
BY
ATTORNEY 3,826,944

CATHODE RAY TUBE WITH INORGANIC PHOSPHOR AND FIBER OPTIC FACE PLATE

BACKGROUND OF THE INVENTION

The present invention relates to a high contrast cathode ray tube. The production of a high contrast cathode ray tube suitable for viewing under high ambient lighting conditions has been a problem for many years. The resolution and brightness of a cathode ray tube are limited by a number of conditions in the conventional type cathode ray tube. The resolution is determined by the beam spot size and the phosphor particles. The brightness is limited by the screen current obtainable and the phosphor luminous efficiency. One particular adverse effect found with conventional cathode ray tubes is that the reflection of the ambient light off of the phosphor material used within the cathode ray tube causes diffusion of the ambient incoming light and the scattering of light rays in the phosphor material. This causes an increase in brightness surrounding the excited areas and results in the contrast being substantially reduced on viewing within an ambient light condition.

One proposed solution is described NASA Report CR-1185 entitled "A Cathode Ray Tube Suitable for Viewing Under High Ambient." The system described in this report describes a system that would permit light to leave the cathode ray tube but would absorb all incident light from the outside. The system described in the NASA report required mounting an ultraviolet filter and an ultraviolet actuated phosphor inside of the tube envelope. Such a structure placed severe limitations on materials due to high processing temperatures employed in the manufacture of a cathode ray tube.

It is generally an object of this invention to provide an improved high contrast device which incorporates a conventional phosphor which emits ultraviolet radiation in response to electron bombardment within a cathode ray tube and provides on the exterior of the envelope a filter transmissive to U.V. but capable of absorbing visible radiation. An organic phosphor is provided on the filter with an external filter provided on the organic phosphor which is transmissive to visible but absorbs ultraviolet. In this manner, evacuation and exhaust of a conventional cathode ray tube may be performed at temperatures greater than 400°C without the danger of damage to organic materials which may be sealed to the exterior surface of the tube after the completion of the manufacture of the cathode ray tube.

SUMMARY OF THE INVENTION

This invention describes a particular electronic tube system for displaying an image of high resolution and the method of manufacture of such device. This is provided by means of a substantially conventional cathode ray tube having a fiber optic output window with an inorganic phosphor provided on the inner surface which can withstand bake-out at a temperature of about 400°C and with an organic phosphor provided on the outer surface of said fiber optic window sensitive to ultraviolet radiation and substantially transparent to visible light with an ultraviolet transmissive filter and visible light absorber positioned between the inorganic phosphor and the organic phosphor and a filter positioned on the viewing surface of said phosphor for absorbing ultraviolet radiation and transmitting visible radiations.

BRIEF DESCRIPTION OF THE DRAWING

For a better understanding of the invention, reference may be had to the preferred embodiment, exemplary of the invention, shown in the accompanying drawing.

DESCRIPTION OF THE PREFERRED EMBODIMENT

Referring to the drawing, there is illustrated a cathode ray tube 10. The envelope 11 includes a neck portion 12, a flared portion 14 and a faceplate portion 16. The faceplate portion 16 includes a fiber optic type window consisting of a plurality of fibers of a diameter of about 5 to 50 microns capable of transmission of light from the inner surface of the faceplate 16 to the outer surface without substantial loss of resolution. Positioned on the inner surface of the window 16 is a phosphor coating 20 which is of a suitable inorganic phosphor such as a P16 phosphor which is $Ca_2, Mg, Si_2, O_7:Ce$. This phosphor coating 20 is responsive to electron bombardment and generates radiation in the ultraviolet region in response to electron bombardment. The coating 20 may be deposited by any suitable technique such as settling the phosphor through suitable cushion of liquid to deposit a coating of about 20 microns in thickness. The coating 20 may also be applied by a cataphoresis process.

A conductive coating 22 is provided on the exposed surface of the phosphor coating 20 of a suitable material such as aluminum and provides means of preventing ion burn of the phosphor coating 20 and also provides a reflective coating for light emitted from the phosphor coating 20. An electron gun 24 is provided in the neck portion 12 of the envelope 11 for generating an electron beam which is directed onto the phosphor screen 20. Suitable deflection means may be provided about the neck portion 12 for scanning the electron beam over the phosphor screen 20 in any suitable manner.

The cathode ray tube 10 is evacuated and normally baked out at a temperature of about 400°C. After the cathode ray tube 10 is completed, a filter 30 is provided on the outer surface of the faceplate 16. The filter 30 is of a suitable material capable of transmitting ultraviolet radiations, that is, in the range of 2,500A to 3,800A while also capable of absorbing visible radiations in the range of 4,000A to 7,000A. The filter 30 is normally of an inorganic material and this filter may also be purchased under the trade name Corning-7-51 and 7-60 filter glass. The filter 30 can be secured to the faceplate 16 by a thin layer of a suitable adhesive, (e.g., Gelatin) or may, simply be held in physical contact thereto. A phosphor coating 32 is provided on the filter 30 and may by an organic material mixed with a suitable plastic material and painted onto the filter 30. The layer 30 may be of a thickness of about 60 to 100 microns. The layer 32 is of a suitable material which is substantially transparent to visible radiations and yet absorbs the ultraviolet radiation emitted from the phosphor layer 20 to generate visible radiations. On particular material is a Q15 dye dissolved in sulfonamel. Alternative to Q15 is Auromine O dissolved in sulfonamel. These materials are supplied by Switzer Brothers of Cleveland, Ohio. The next layer 34 on the outer surface of the phosphor layer 32 is a layer 34 which is a filter which transmits radiation in the visible range and absorbs radiation in the ultraviolet range. A suitable filter for this application is a Kodak 1A sky-light filter or a Corning 3-73 sharp cut yellow filter. The filter layer 34 may be secured by a thin layer of a suitable adhesive (e.g., Gelatin) or again simply held in physical contact with layer 32. It should also be noted that the filter 30 may be omitted if a special fiber optic plate is utilized in which the core glass of each of the fibers 18 provides the filtering action, that is, of transmitting ultraviolet radiation but absorbing visible radiation.

By this process of manufacture, it is not necessary to subject the materials in the layers 30, 32 and 34 to the high exhausting temperatures required in the manufacture of cathode ray tube 10. In addition, the layer 32 and 34 may be easily replaced at any time to provide a different color output or to provide repair of a defective or exhausted phosphor layer. The thin layer 30 provides improved resolution in that it does not diffuse the incoming ultraviolet energy from the phosphor layer 20 and the incoming ambient light will pass through the phosphor layer 32 and be absorbed within the filter 30.

In the operation of the device, the electron beam from the gun 24 excites the phosphor layer 20 which causes the layer 20 to generate ultraviolet radiations corresponding to the energy of the electron beam. The ultraviolet radiations from the layer 20 are directed through the fiber optic faceplate 16 and the ultraviolet transmissive layer 30 to excite the phosphor layer 32. The phosphor layer 32 in response to ultraviolet excitation generates visible light which is transmitted through the filter 34 to the viewer. Ambient light entering through the filter 34 passes through the phosphor layer 32 and is absorbed by the layer 30. In this manner, the ambient lighting condition in no way effects the light output or contrast of the two. There is no reflection or diffusion of the ambient light.

Numerous changes may be made in the above described system without departing from the spirit and scope of the invention, and it is intended that all matter contained in the foregoing description or shown in the accompanying drawing shall be interpreted as illustrative and not in a limiting sense.

I claim as my invention:

1. A display tube comprising an evacuated envelope and having a fiber optic faceplate therein, an inorganic phosphor layer provided on the inner surface of said fiber optic window, an electron beam for exciting said inorganic phosphor layer to cause the emission of ultraviolet radiations therefrom and through the light fibers in said window, an organic phosphor layer provided on the external side of said fiber optic window and responsive to the ultraviolet radiations from said inorganic phosphor layer to generate a visible light image, a first filter means provided between said organic phosphor and said inorganic phosphor transmissive to ultraviolet radiations and capable of absorption of visible radiation and a second filter means provided on the opposite side said organic phosphor with respect to said first filter means capable of transmitting visible radiation and absorption of ultraviolet radiation.

2. The device in claim 1 in which said first filter means is a filter member positioned between said organic phosphor layer and said window.

3. The device set forth in claim 1 in which said first filter means provided between said organic phosphor and said inorganic phosphor is filter means provided within the light fibers of said window.

* * * * *